(12) United States Patent
Walton et al.

(10) Patent No.: US 12,361,801 B2
(45) Date of Patent: Jul. 15, 2025

(54) COMPUTER-IMPLEMENTED EMERGENCY ALERT LIGHTING SYSTEM

(71) Applicant: FIRST RESPONSE LIGHTING SOLUTIONS, LLC, West View, PA (US)

(72) Inventors: Christopher Walton, Pittsburgh, PA (US); Robert M. Stone, West View, PA (US); David Casteel, Gibsonia, PA (US)

(*) Notice: Subject to any disclaimer, the term of this patent is extended or adjusted under 35 U.S.C. 154(b) by 7 days.

(21) Appl. No.: 18/366,037

(22) Filed: Aug. 7, 2023

(65) Prior Publication Data

US 2024/0071187 A1 Feb. 29, 2024

Related U.S. Application Data

(60) Provisional application No. 63/373,576, filed on Aug. 26, 2022.

(51) Int. Cl.
| | | |
|---|---|---|
| *G08B 5/36* | (2006.01) | |
| *G08B 5/38* | (2006.01) | |
| *H04W 4/90* | (2018.01) | |

(52) U.S. Cl.
CPC ............ *G08B 5/36* (2013.01); *G08B 5/38* (2013.01); *H04W 4/90* (2018.02)

(58) Field of Classification Search
CPC .................................. G08B 5/36; G08B 5/38
See application file for complete search history.

(56) References Cited

U.S. PATENT DOCUMENTS

| | | | |
|---|---|---|---|
| 7,791,282 B2 | 9/2010 | Yu et al. | |
| 9,543,788 B2 | 1/2017 | Recker et al. | |
| 10,755,537 B1* | 8/2020 | Palmer | G08B 13/19695 |
| 11,341,825 B1* | 5/2022 | Palmer | G08B 3/10 |
| 11,373,491 B2 | 6/2022 | Stone et al. | |
| 12,087,149 B2* | 9/2024 | Ulleweit | G08B 5/36 |
| 2007/0035255 A1 | 2/2007 | Shuster et al. | |
| 2008/0064365 A1* | 3/2008 | Lang | H04M 11/04 |
| | | | 455/414.1 |
| 2014/0253733 A1 | 9/2014 | Norem et al. | |
| 2017/0336088 A1* | 11/2017 | Hynes | F24F 11/46 |
| 2019/0182942 A1* | 6/2019 | Kamp | H05B 47/19 |

* cited by examiner

*Primary Examiner* — John A Tweel, Jr.
(74) *Attorney, Agent, or Firm* — McNees Wallace & Nurick LLC

(57) ABSTRACT

A computer-implemented method and computer-readable medium for alerting emergency personnel. Using a mobile device, a signal is transmitted to a control hub, the control hub in wireless communication with a server. In response, the signal then transmits from the control hub to a designated switch of a light fixture in the user's home, for example, wherein the light fixture is activated into a flashing mode such that a visible, flashing display of light is presentable external to the home of the user to the emergency personnel. Concurrently, the signal from the mobile device then transmits from the control hub to a 911 call center; and, optionally, the signal can be transmitted over the server to a third-party emergency contact.

19 Claims, 21 Drawing Sheets

Register New Account Page

Add a Device

Name your device (Home, Main Switch, etc)

Serial Number / QR code located on back of hub

QR code back of hub to scan with phone camera to automatically input serial number.

Call and Alert Screenshots

Signal Location

COMPUTER-IMPLEMENTED EMERGENCY ALERT LIGHTING SYSTEM

CROSS-REFERENCE TO RELATED APPLICATION

The present application claims benefit of provisional application Ser. No. 63/373,576, filed Aug. 26, 2022, the contents of which are incorporated herein by reference.

FIELD OF THE INVENTION

The present invention relates to signaling systems, particularly for alerting and signaling emergency personnel via a mobile computer application.

BACKGROUND OF THE INVENTION

U.S. Pat. No. 11,373,491 to Stone et al., the contents of which are incorporated herein in its entirety, teaches an emergency lighting security system which has a system control panel, a plurality of predetermined light fixtures, each light fixture in communication with a smart switch in data communication with the system control panel. Wi-fi repeaters boost signal strength within an installation, and a key-fob operable by a homeowner initiates an emergency signal to the control panel to set the smart switches into a strobe or flash mode controlling the light fixtures. This system enables emergency responders to respond more quickly to emergency situations, since it is not necessary to look for house numbers. Flashing lights are more readily visible at night when many emergencies occur.

This system is largely a stand-alone system in which a hand-held key fob is provided to one or more residents. In one embodiment a key FOB can be configured to control multiple smart switches. In case of an emergency, a button on a key fob may be activated to transmit an emergency signal to either the switch or control panel. In response to the emergency signal, the control panel transmits a signal to the designated communication switches to activate the designated light fixtures into a flashing/strobing mode indicating an emergency situation. The system may also be incorporated into existing monitoring and security systems, medical alert systems, or other systems designed for security or emergency notification situations.

Drawbacks exist inasmuch as the control devices are separate components that can be lost or misplaced during an emergency situation and are not always readily available in an emergent situation. The control devices add to cost and additionally run the risk of losing operational function due to breakage or power drainage. Such devices are also singular in nature in terms of communication, meaning they can only communicate with the one, synced light switch.

There is a need then, as provided herein, to provide mobile application software and the associated computer-implemented method to allow users to use the instant emergency system by way of their smartphone, which concurrently allows for direct communication to emergency personnel and third party, alerted contacts in addition to the exterior lighting flash.

SUMMARY OF THE INVENTION

Comprehended is a computer-implemented system and computer-implemented method wherein a user, using a smartphone, interacts with an emergency signal control hub by transmitting a signal thereto; and, in response, a signal is transmitted to a designated switch within a light fixture, to thereby activate the light fixture such that the light fixture enters into a flashing mode. Concurrently, the signal is transmitted, optionally, to a third-party emergency contact. To effectuate, data is transferred from the smartphone mobile application software, i.e. computer-readable medium, to a server stack. The user's Wi-fi hub connection communicates with the server stack, which, in turn, communicates with a server based upon a unique hub serial number. The hub communicates with a light-embedded switch. The designated switch is thereby activated or deactivated based upon the communication between the user and the server.

More particularly, provided is a computer-implemented method for alerting emergency personnel, comprising the steps of: using a mobile device, transmitting a signal to a control hub, the control hub in wireless communication with a server; in response, allowing the signal from the mobile device to then transmit from the control hub to a designated switch of a light fixture, wherein the light fixture is activated into a flashing mode such that a visible, flashing display of light is presentable to the emergency personnel; concurrently, allowing the signal from the mobile device to then transmit from the control hub to a 911 call center; and, optionally, allowing the signal to concurrently transmit over the server to a third-party emergency contact.

In further embodiments, the method comprises: the step of programming the smart switch, wherein for the step of programming the smart switch, a production programming environment tool is downloaded onto a computer, and the smart switch, in communication with the computer, is loaded with the production programming environment tool. In addition, the method includes the step of setting up the control hub, wherein the step of setting up the control hub further comprises linking the control hub to the mobile device; and, adding a device to a user account on the mobile device as part of a device addition module such that the control hub can be linked to the mobile device. As part of this process, a serial number is added into the user account, the serial number being located on the control hub, which is connected to the control hub using a user's local Wi-fi. As such, for the step of allowing the signal to concurrently transmit over the server to a third-party emergency contact, utilized is an activation of an emergency alert contact module, wherein an emergency contact list includes the third-party emergency contact such that the third-party emergency contact receives the signal and is thereby alerted.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
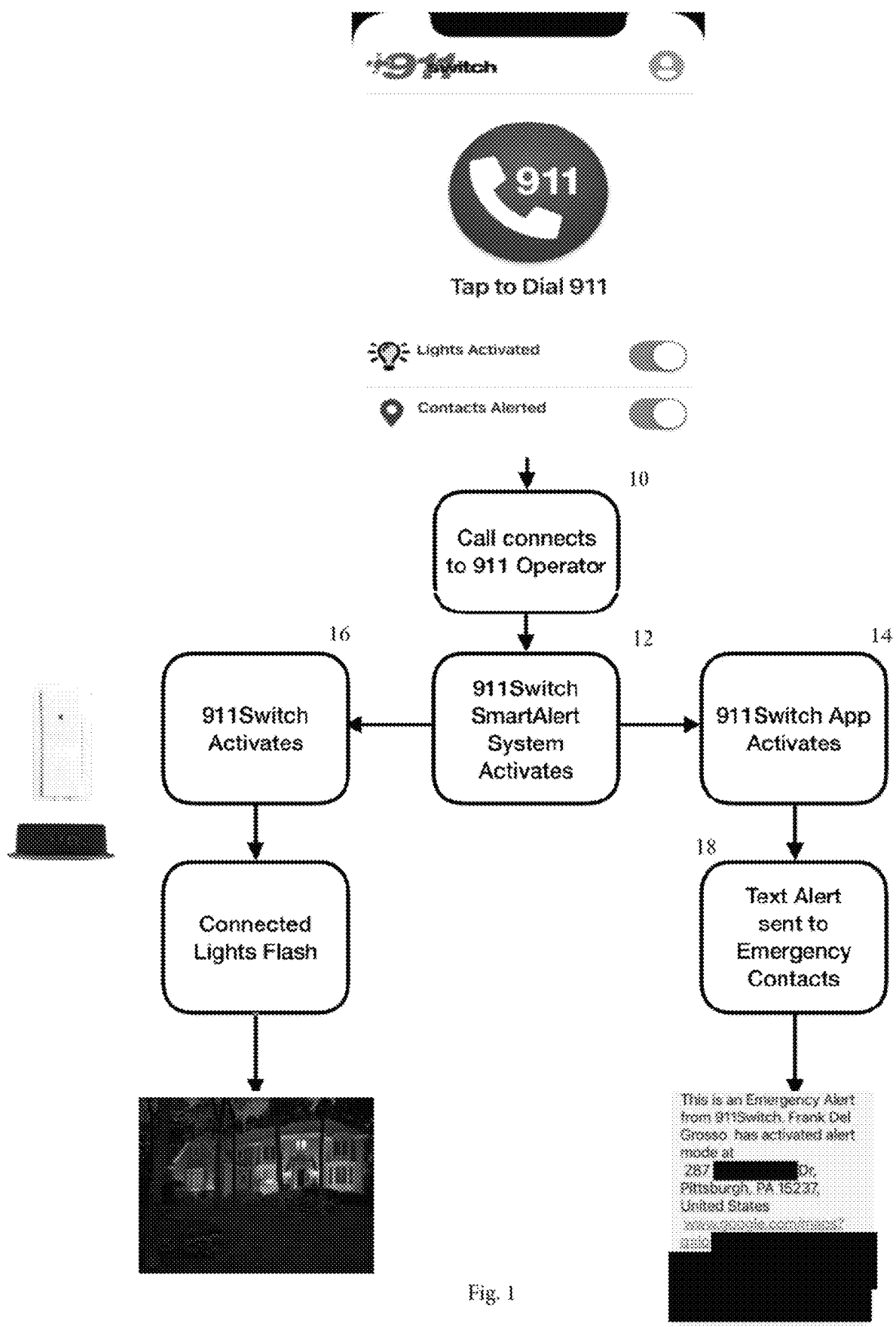
FIG. 1 shows a flow chart showing the overall process and method being performed by the computer/mobile device and associated system components.

Applicant incorporates U.S. Pat. No. 11,373,491 to Stone et al. in its entirety. The instant computer-implemented system and computer-implemented method is particularly useful with the lighting alert system disclosed therein. Herein provided is the smartphone system and method for interacting with an emergency signal control hub.

Embodiments and the operations shown in the drawings and described in this specification are computer-implemented systems and methods. This means it can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including, by way of example, a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example, an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

It should be known a computer program is an executable program of instructions which can be executed on one computer or on multiple computers that are located at one site or distributed across multiple sites and interconnected by a communication network. Generally, a computer will also include, or be operatively coupled to receive data from or transfer data to, or both, one or more mass storage devices for storing data. The instant method is especially suited for use in a computer that can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry. Additionally, processors for execution of a computer program include, by way of example, both general and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment and other features as is known in the art.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or transact, or authorizing the same.

Referencing then FIGS. 1-21, shown is the computer-implemented system. As part of the overall methodology, an emergency contact module (as further defined) communicates to 911 from "911 activation" of the user to connect to 911 10. This occurs when the user activates an emergency signal control hub as part of the herein 911Switch Smartalert System activation 12, downloaded as mobile application software 14, to thereby further connect with a light switch 16. As such, upon activation of the emergency alert system, communication signals are sent in triplicate—to 911; the switch; optionally, to a third-party emergency contact 18.

Figure 2:
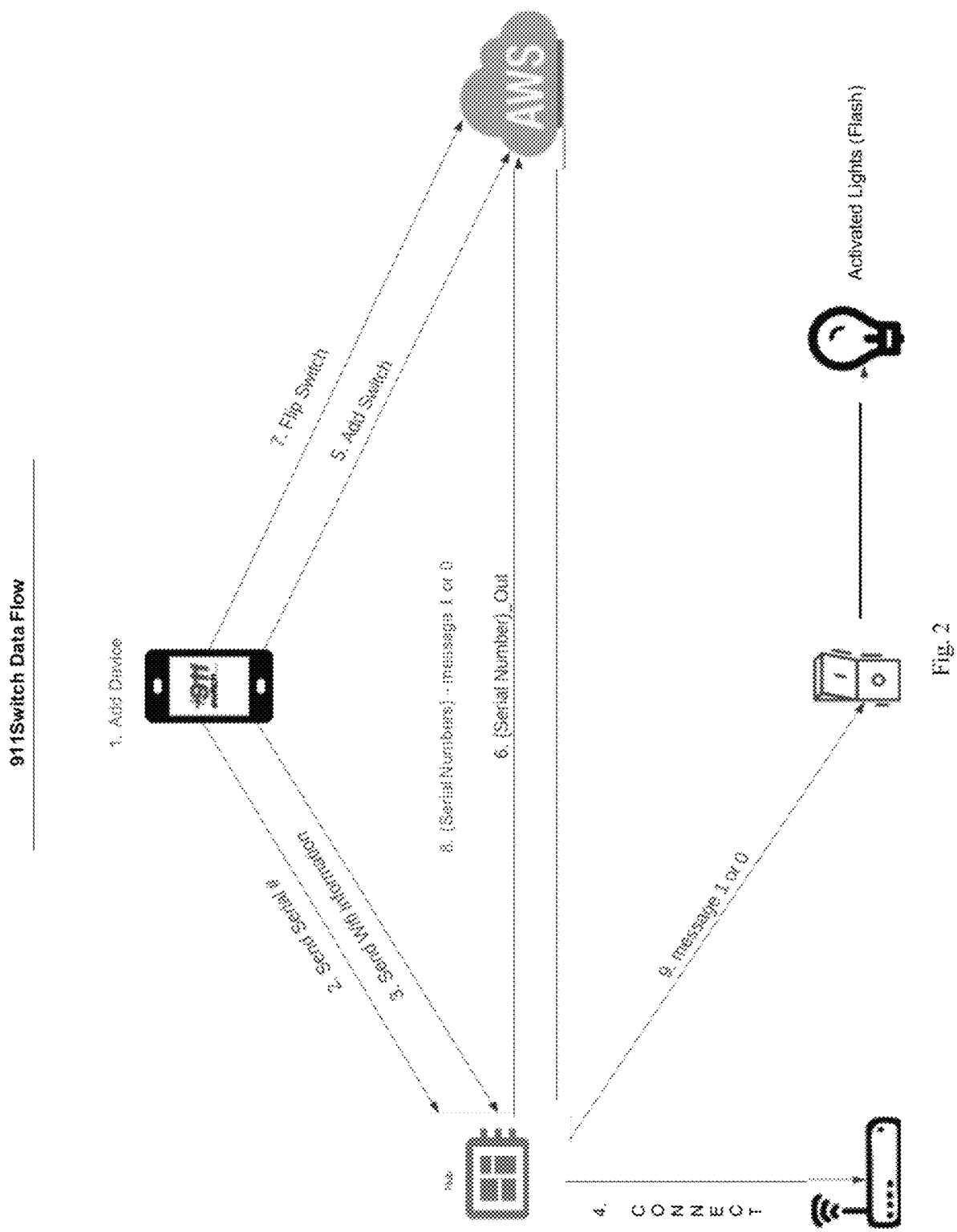
FIG. 2 is a flow chart depicting the data and signal flow.
Figure 3:
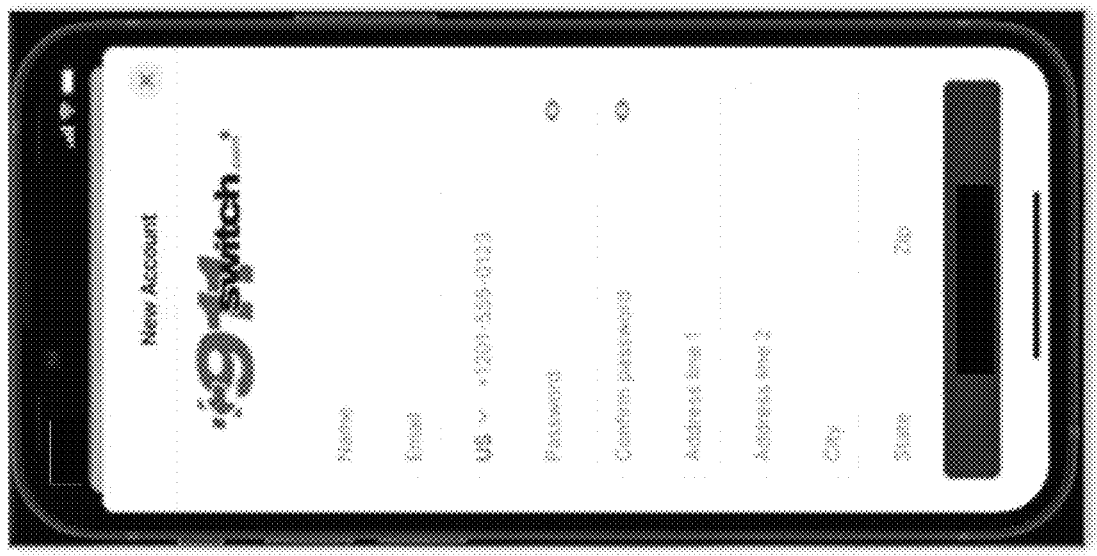
FIG. 3 shows a wireframe of the register new account page.
Figure 4:
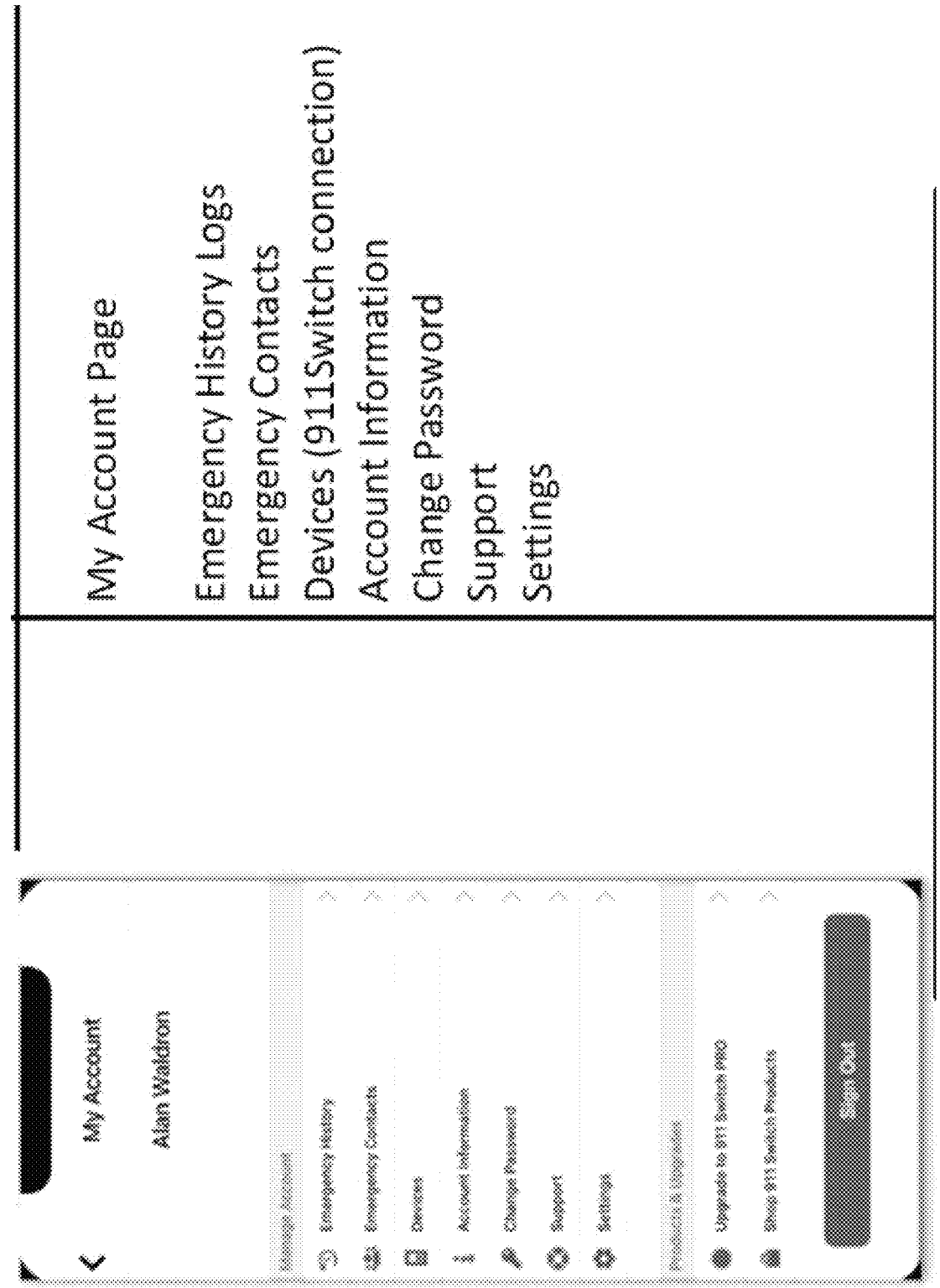
FIG. 4 shows a wireframe of the accounts and set up pages.

To effectuate the signal and data transfer, data is transferred from the smartphone mobile application software, i.e. computer-readable medium, to a server stack. The server can reside locally or, preferably, be cloud-based much like dedicated, third-party services (AWS). The server stack is communicated to by the user's Wi-fi hub connection, which, in turn, communicates with a server based upon a unique hub serial number. The designated switch is thereby activated or deactivated based upon the communication between the user and the server. For instance, the flow chart of FIG. 2 represents the data transfer from smartphone app to AWS server stack, hub connection to users Wi-fi, hub communicating with server based upon unique hub serial number and 911Switch activate or deactivate communication between user and server.

As such, upon activation of the emergency alert system, communication signals are sent in triplicate—to the switch; optionally, to a third-party emergency contact; direct to 911, and computer-implemented method wherein a user, using a smartphone or similar, interacts with an emergency signal control hub by transmitting a signal thereto; and, in response, a signal is transmitted to a designated switch to thereby activate a light fixture such that the light fixture enters into a flashing mode. Concurrently, a third party designated within an emergency alert contact list, receives the emergency signal. The use of "module" refers to a discrete unit of code that performs the specific task or provides a particular functionality. The modules referenced herein can be designed to be reusable, modular and independent, and can be libraries, classes, functions or even entire programs, some of which are represented by the blocks and chains within the drawings and flow charts.

A user downloads the associated mobile application software (app.) from their app. store to their mobile device. The user creates an account as a first-time user. The account information preferably required of the system includes a user's email address, password, name, address and phone number. Optional fields may apply. A user then logs into their account using the email and password used for account set up (see FIG. 3 for example).

Figure 5:
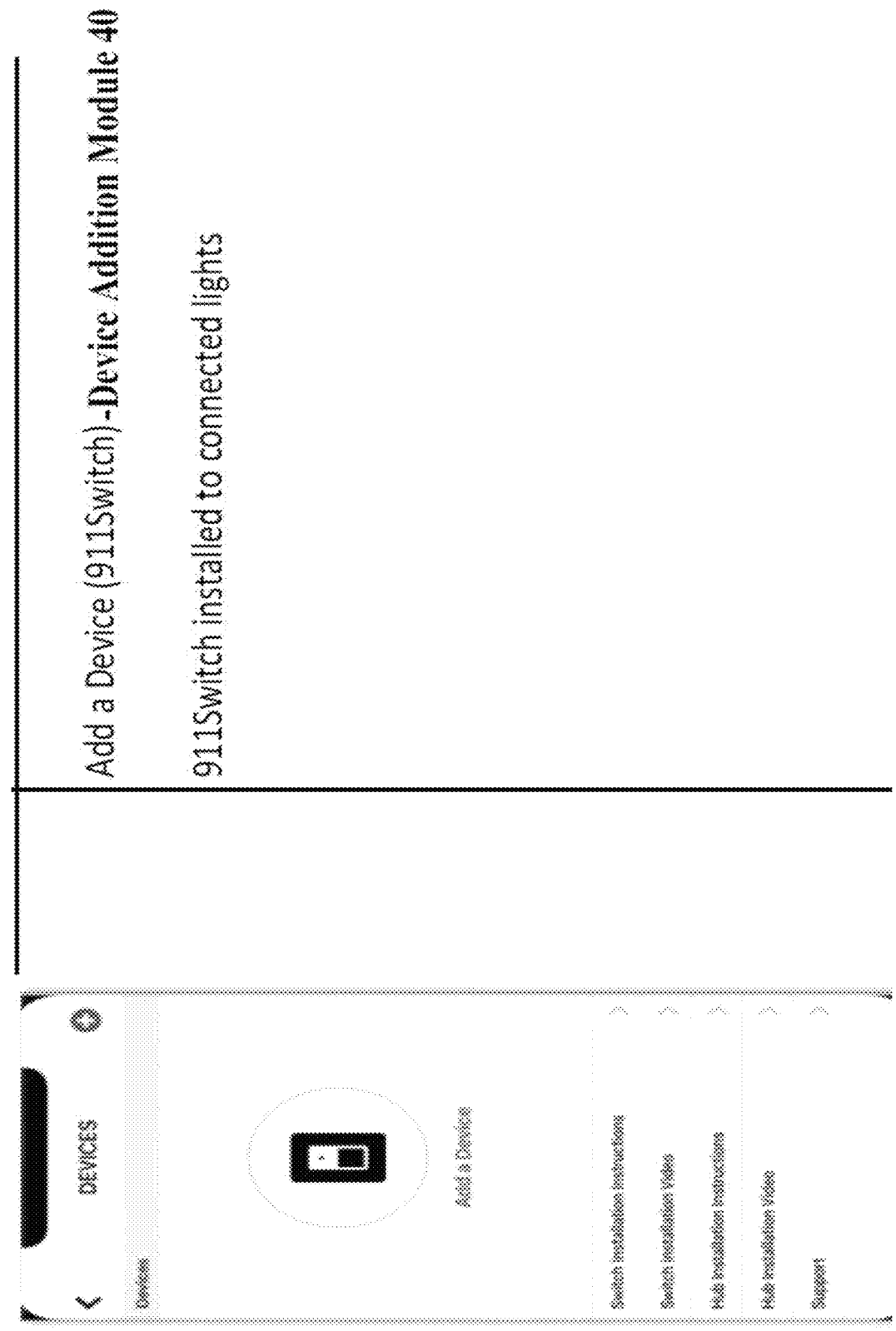
FIG. 5 shows a wireframe of the connection and device addition set up.
Figure 6:
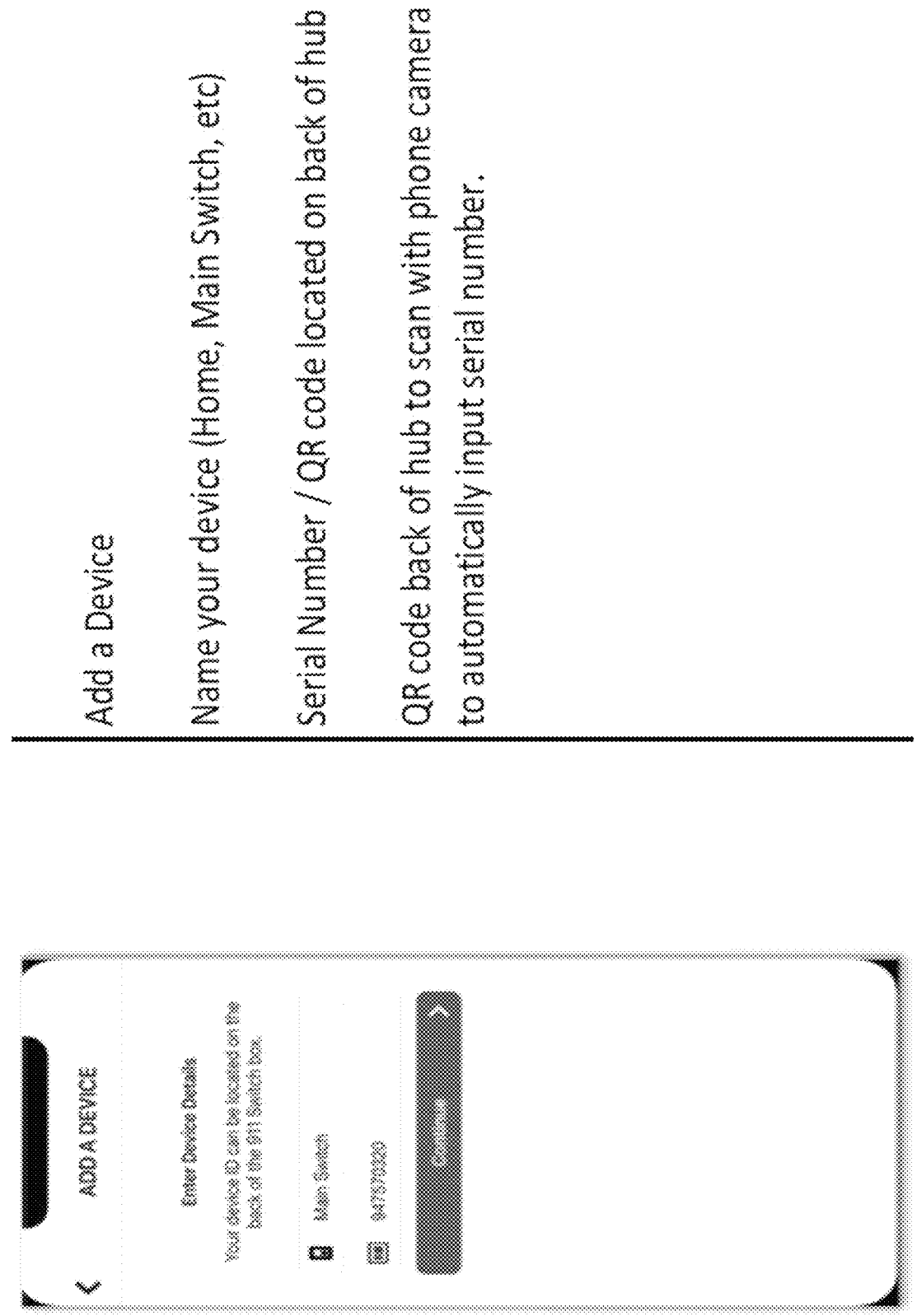
FIG. 6 shows an additional wireframe of the connection and device addition set up.
Figure 7:
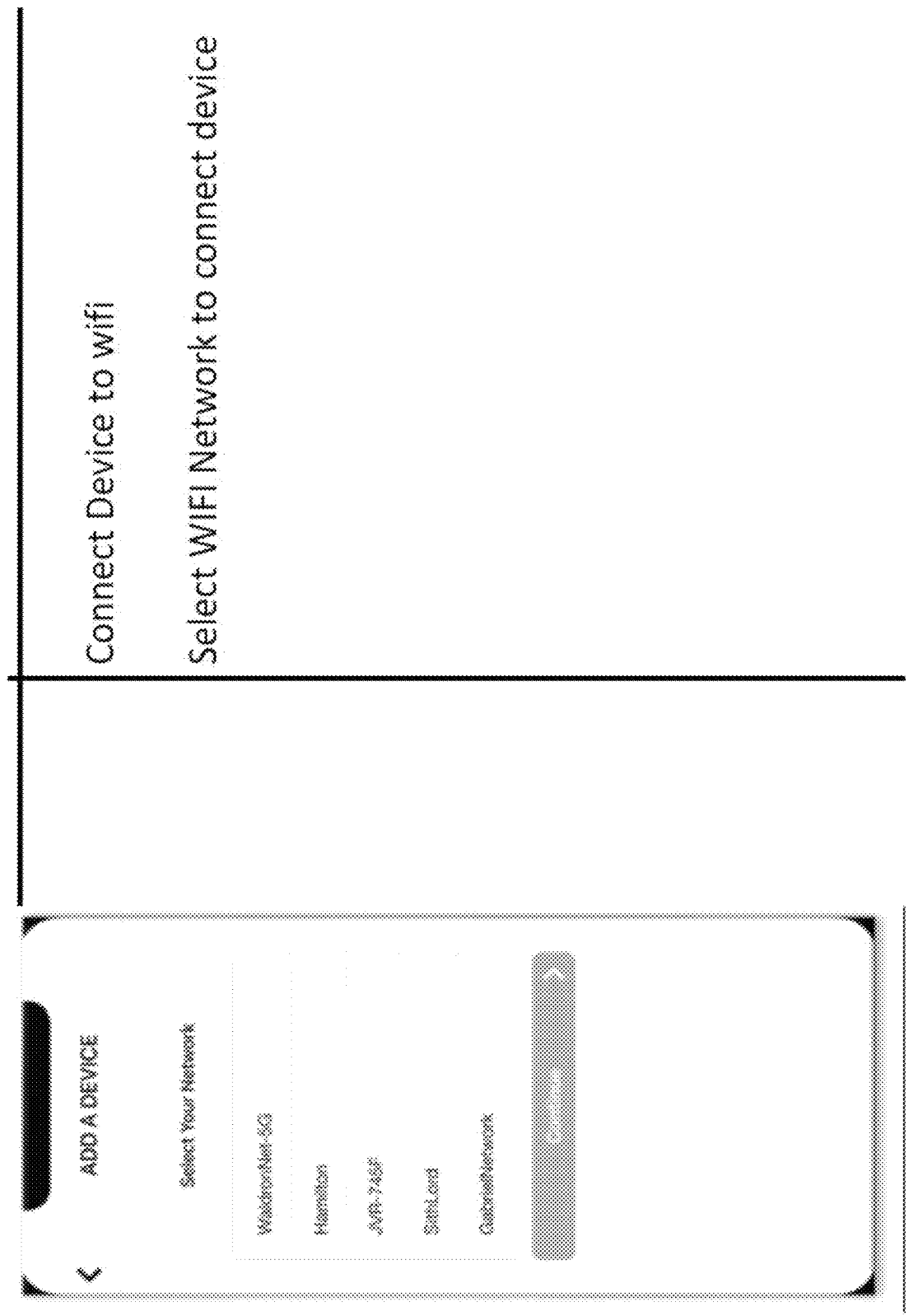
FIG. 7 shows a wireframe of the Wi fi connection set up.
Figure 8:
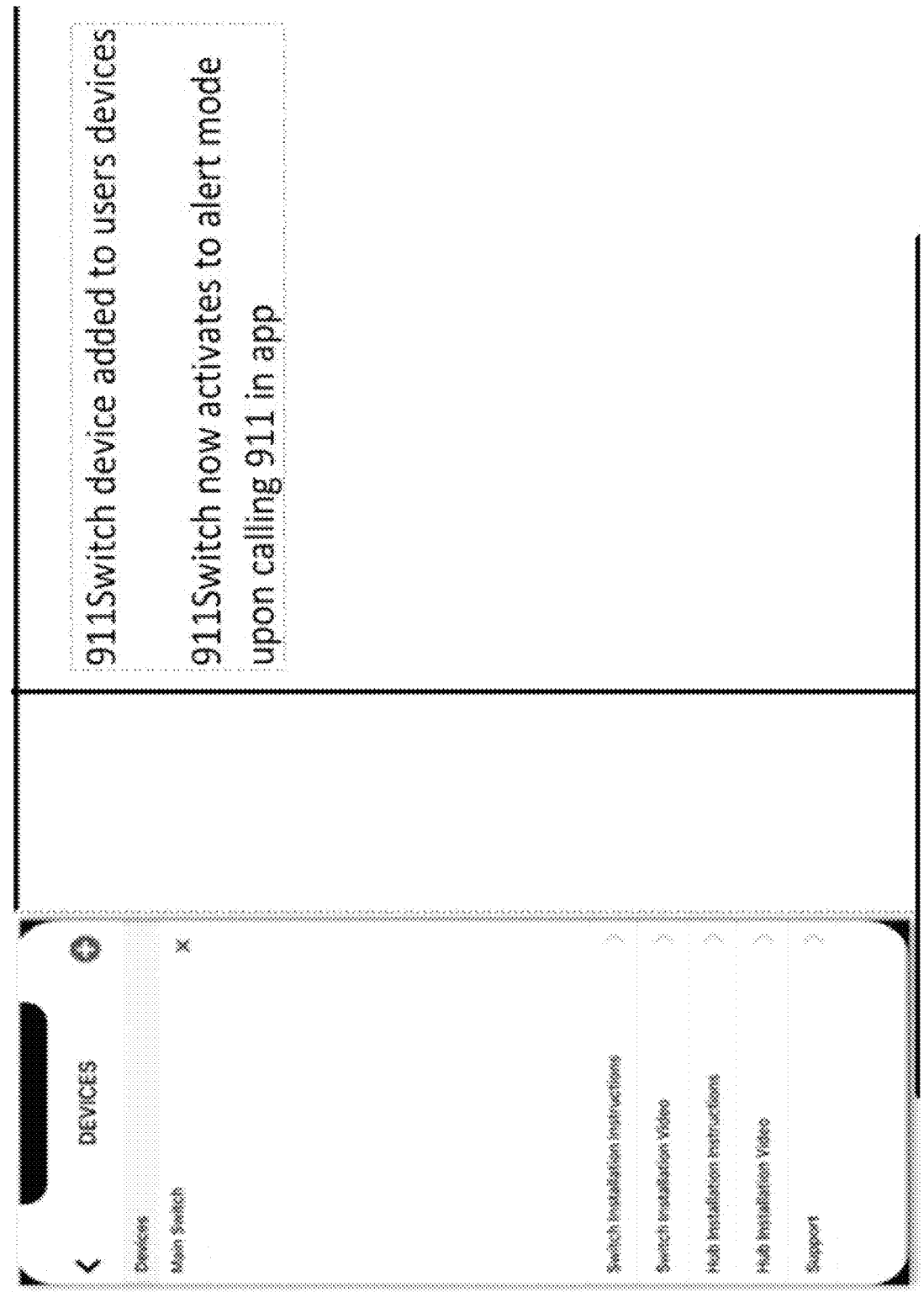
FIG. 8 shows an additional wireframe of the Wi fi connection set up.
Figure 9:
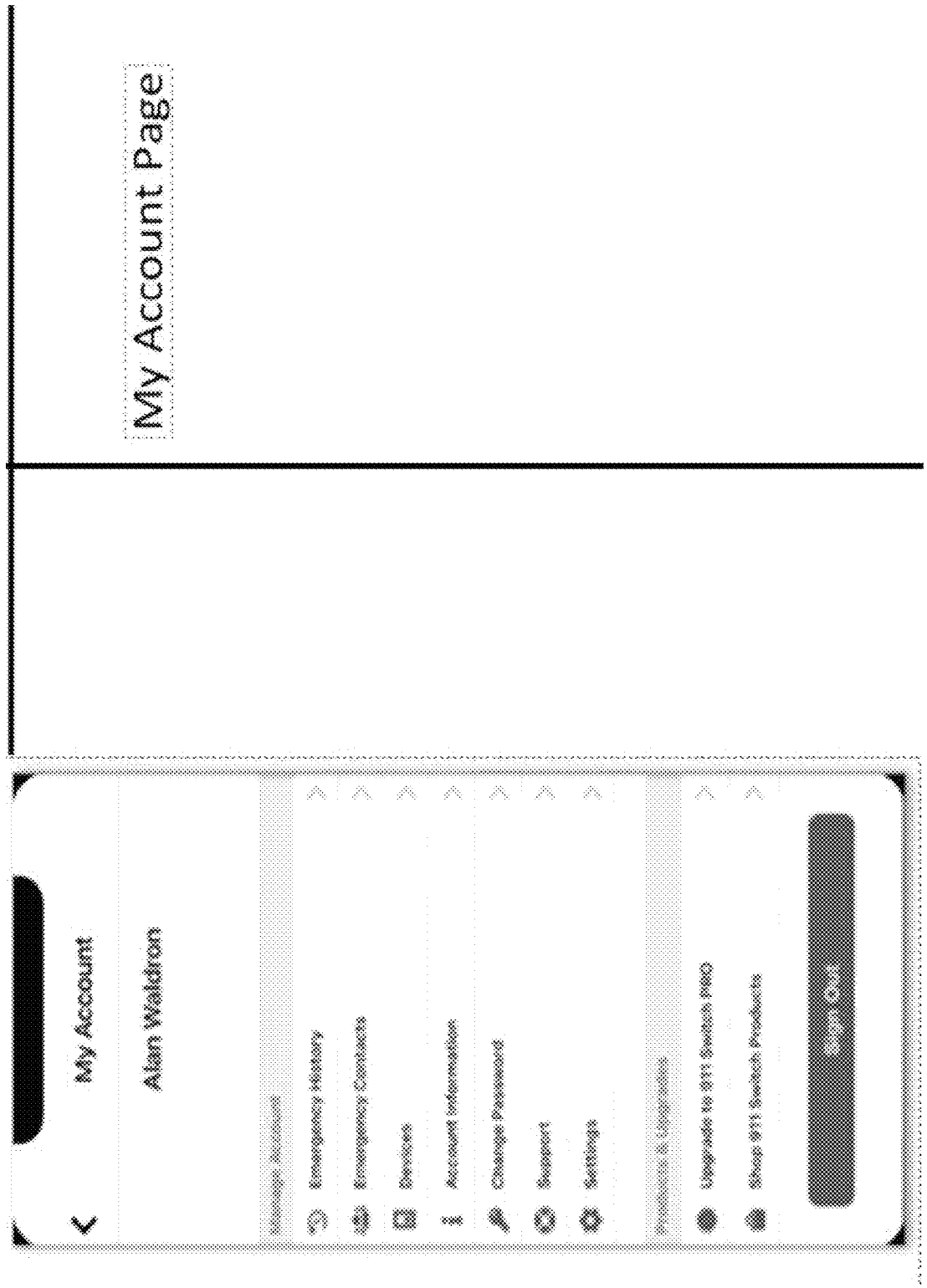
FIG. 9 shows a wireframe of the account page.
Figure 10:
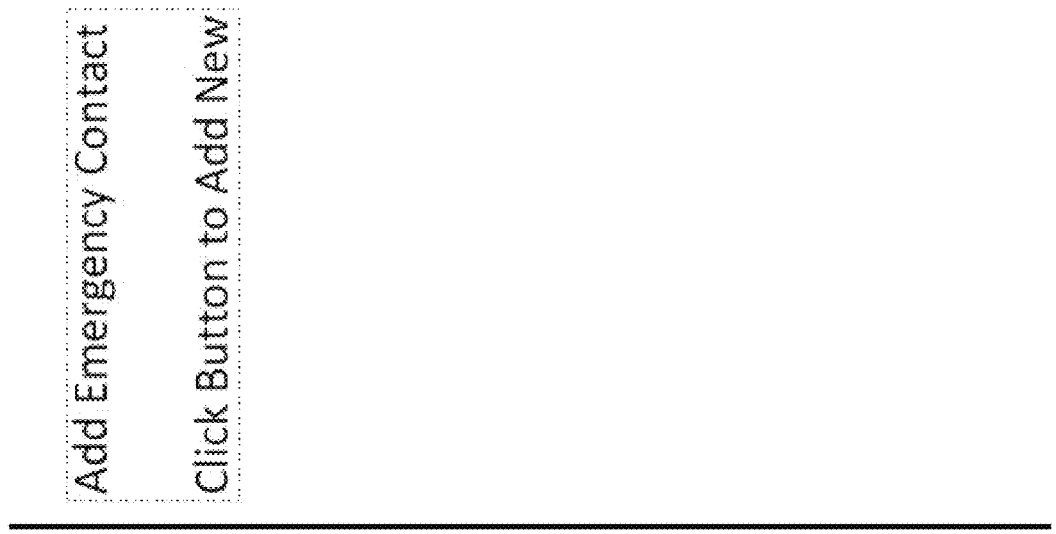
FIGS. 10-12 shows wireframes of the emergency contact alert module.
Figure 10:
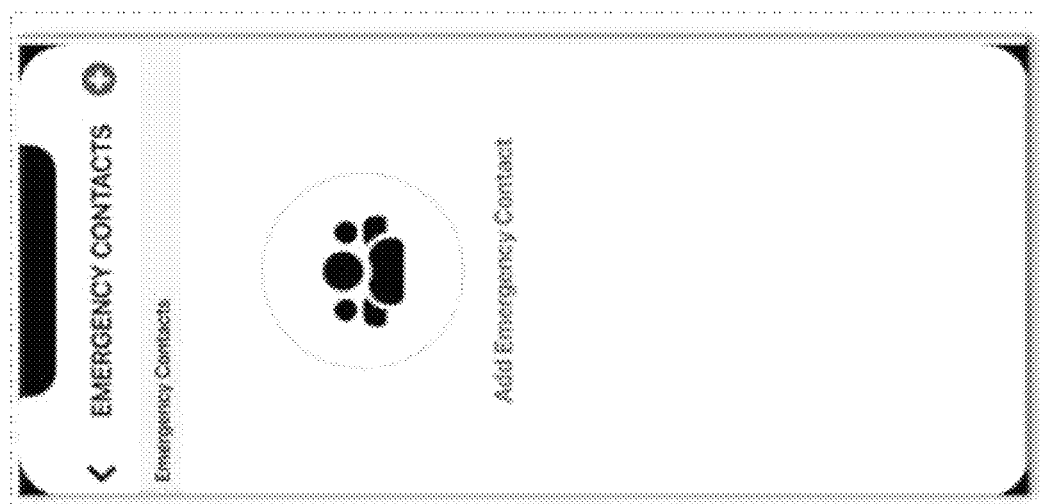
Figure 11:
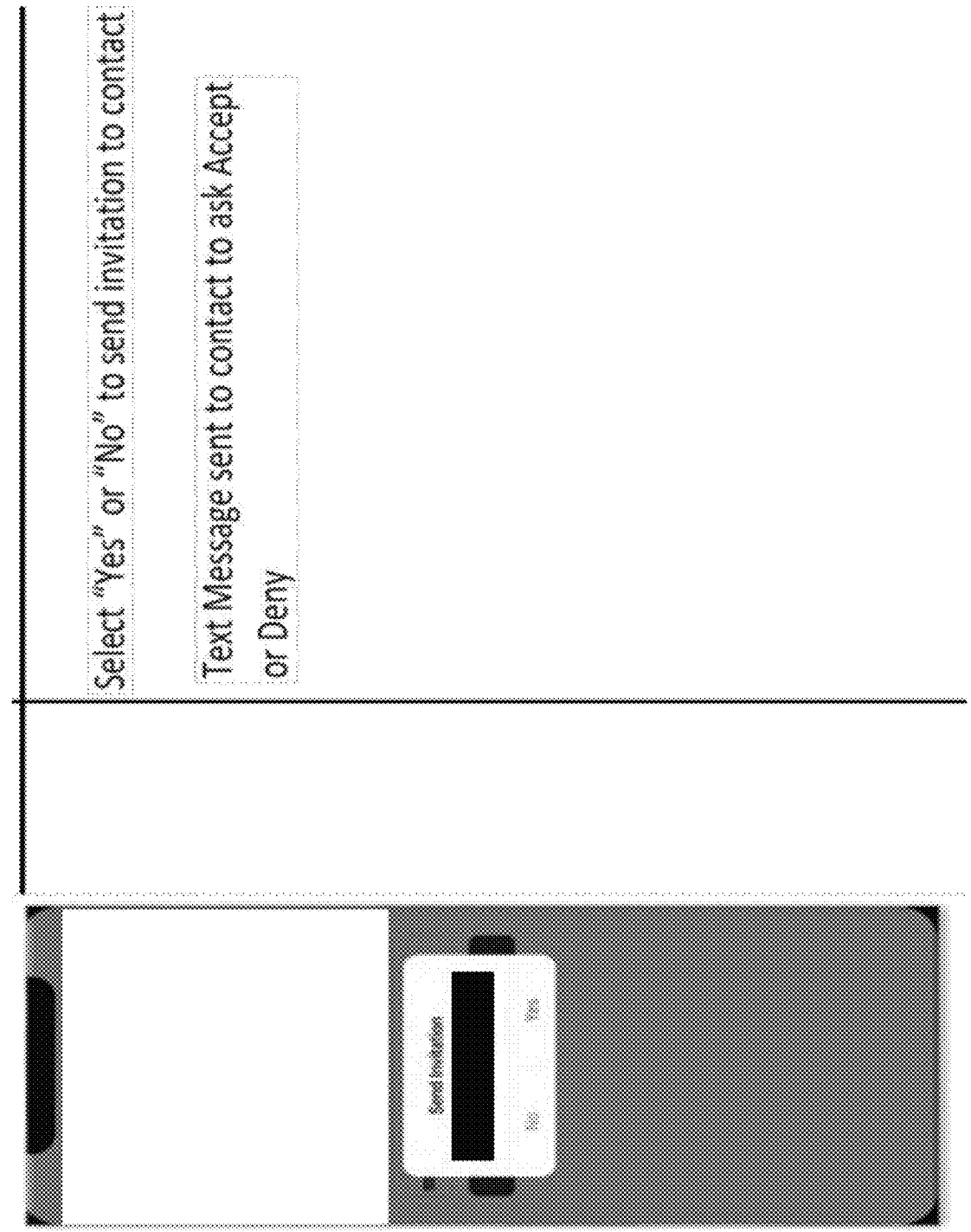
Figure 12:
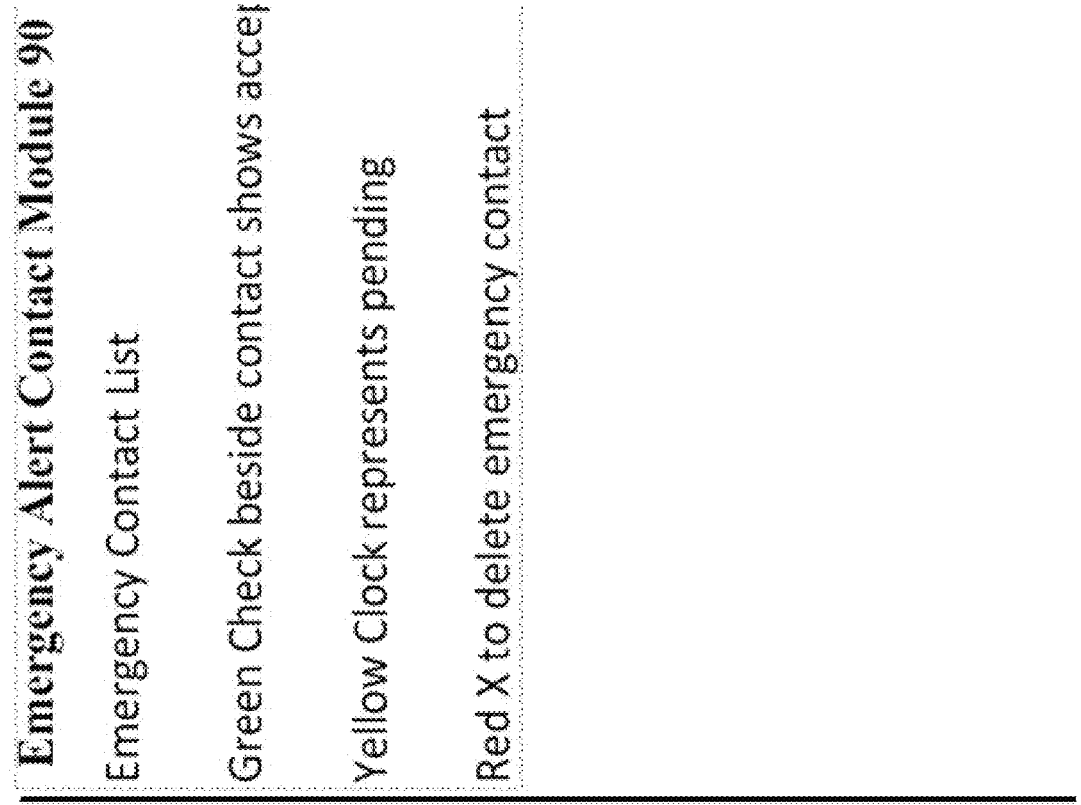
Figure 12:
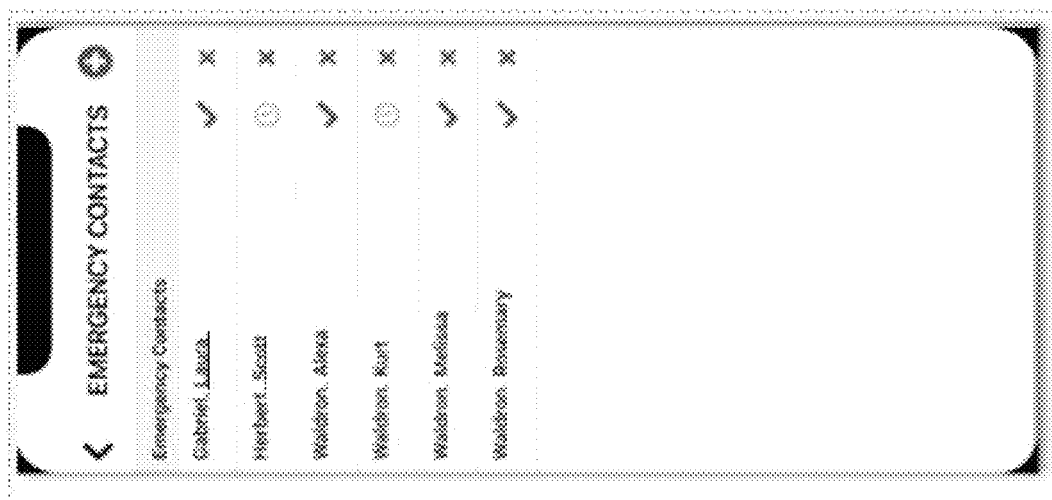
Figure 13:
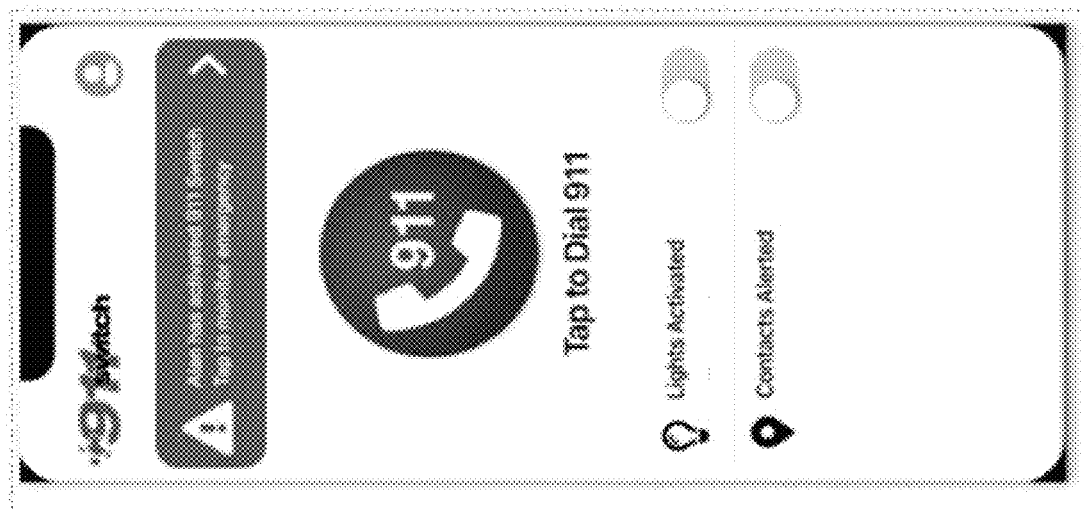
FIGS. 13-14 shows wireframe of the call and alert pages including signal location.
Figure 14:
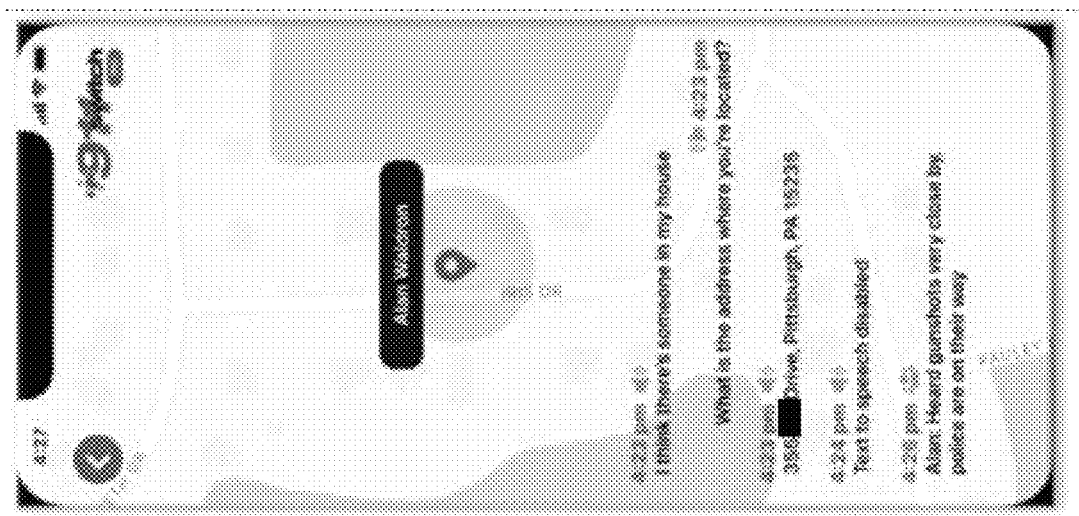
Figure 15:
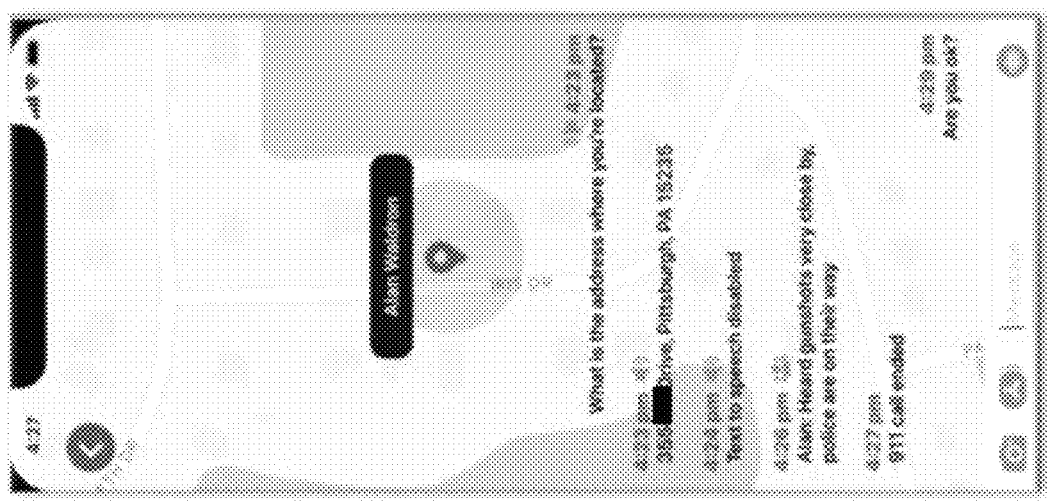
FIG. 15 shows a wireframe of the emergency chat module.
Figure 16:
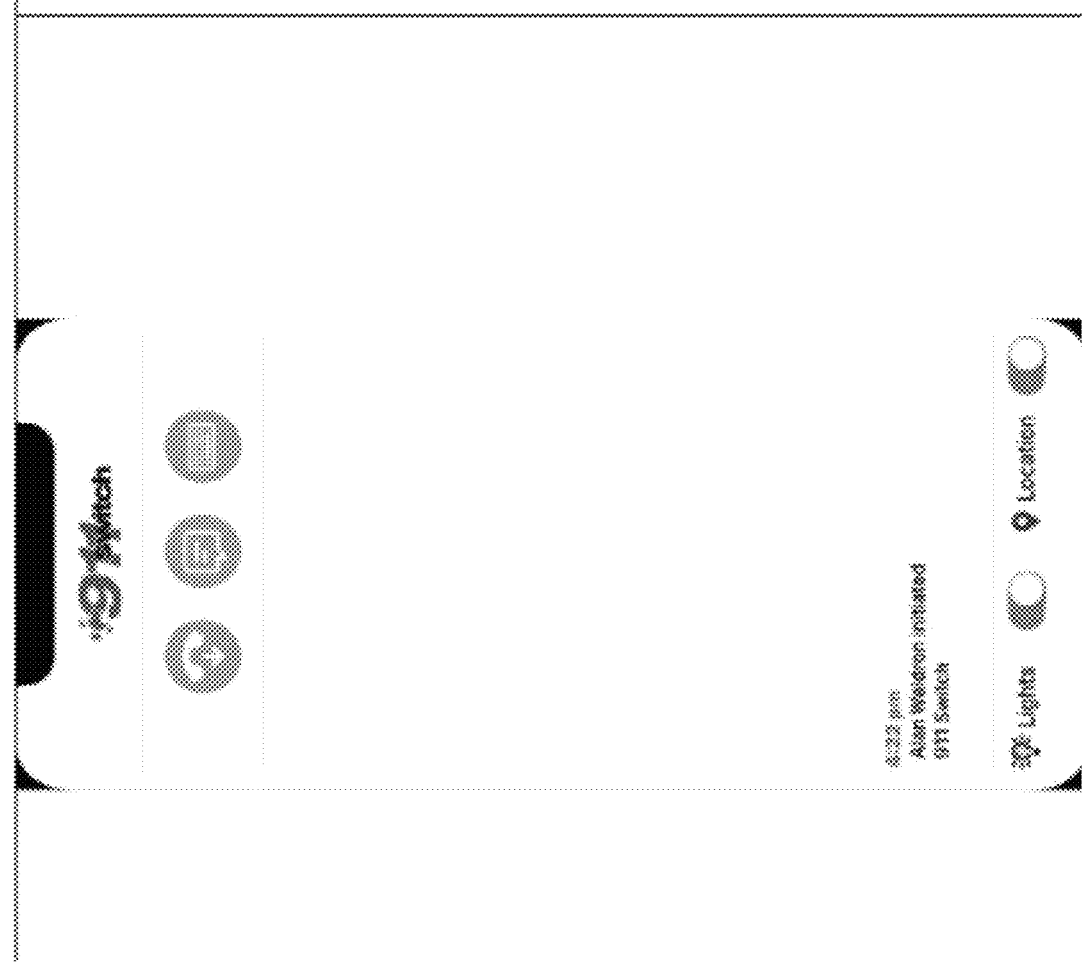
FIG. 16 shows a wireframe of the 911 display.
Figure 17:
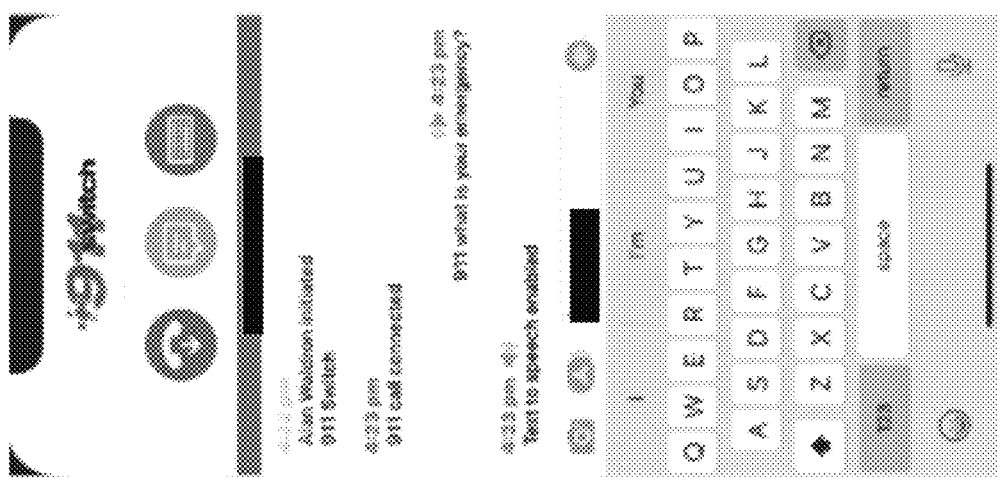
FIG. 17 shows a wireframe of example 911 communications.
Figure 19:
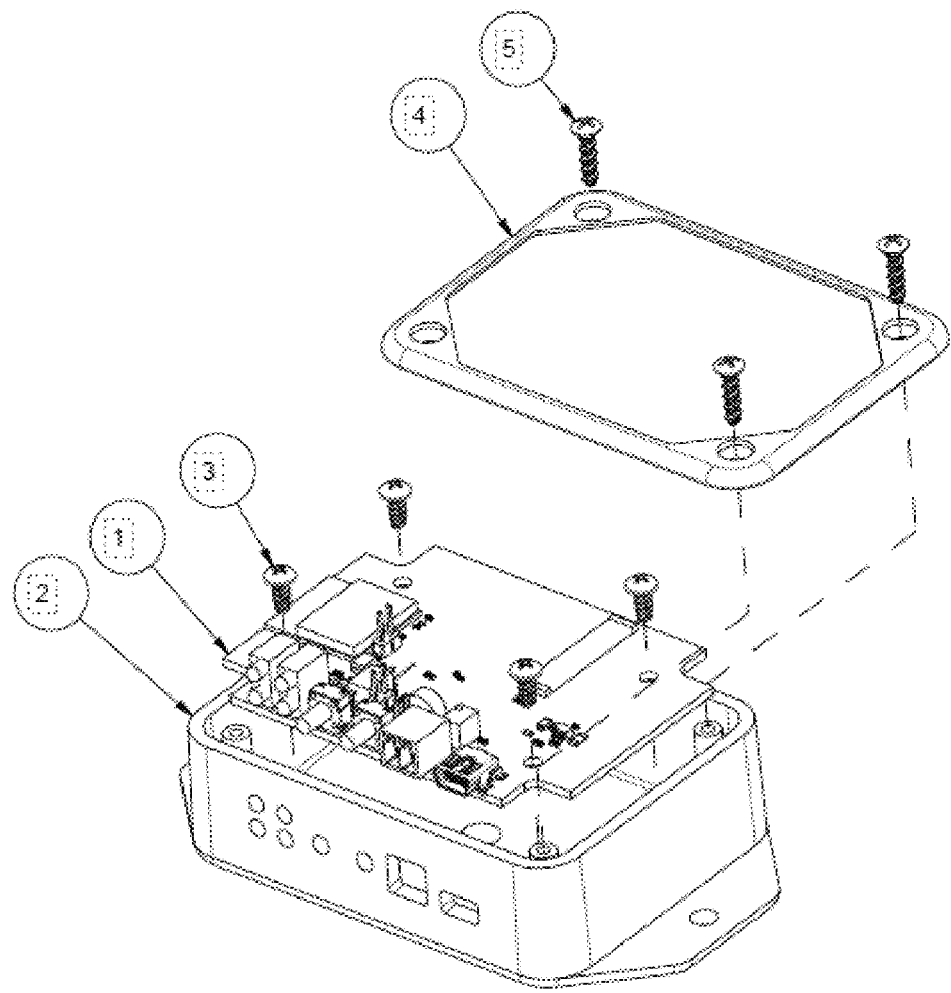
FIG. 19 shows an exploded perspective view of the control hub including the case and control board (PCB) assembly.
Figure 20:
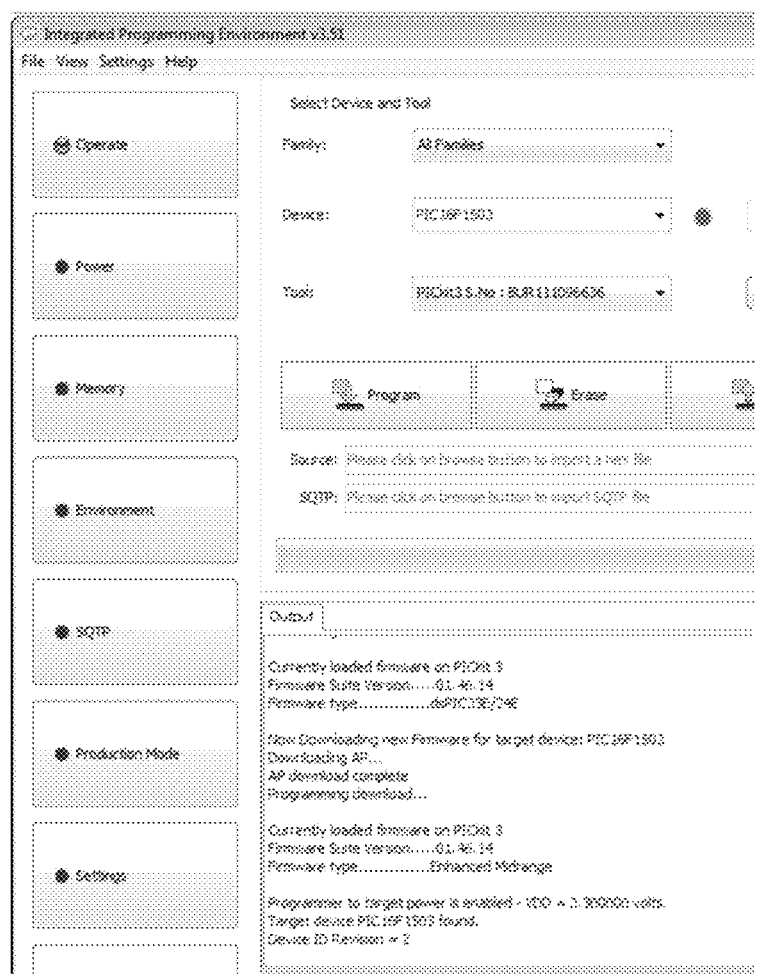
FIG. 20 shows an example screenshot of the programming environment to program the PCB assembly firmware for the control hub.
Figure 21:
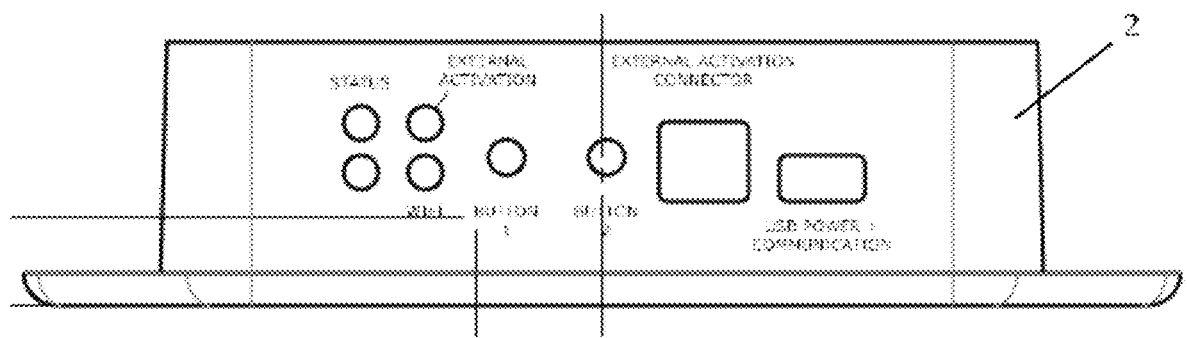
FIG. 21 shows a front elevational view of the control hub.

Next, a user "adds a device" (FIG. 5). For this, termed herein device addition module 40, the user will be adding an emergency signal control hub (FIG. 19). The emergency signal control hub is part of the instant system and is a network hub device purchased by the end user which is in communication with the user's wireless (Wi-fi) connection activated by the mobile application. The emergency signal control hub, or control hub, comprises PCB assembly 1 housed within a hub enclosure 2, screwed therein using forming screw 3. A case cover 4 is screwed onto hub enclosure via cover screw 5 to thereby house the hardware.

Figure 18:
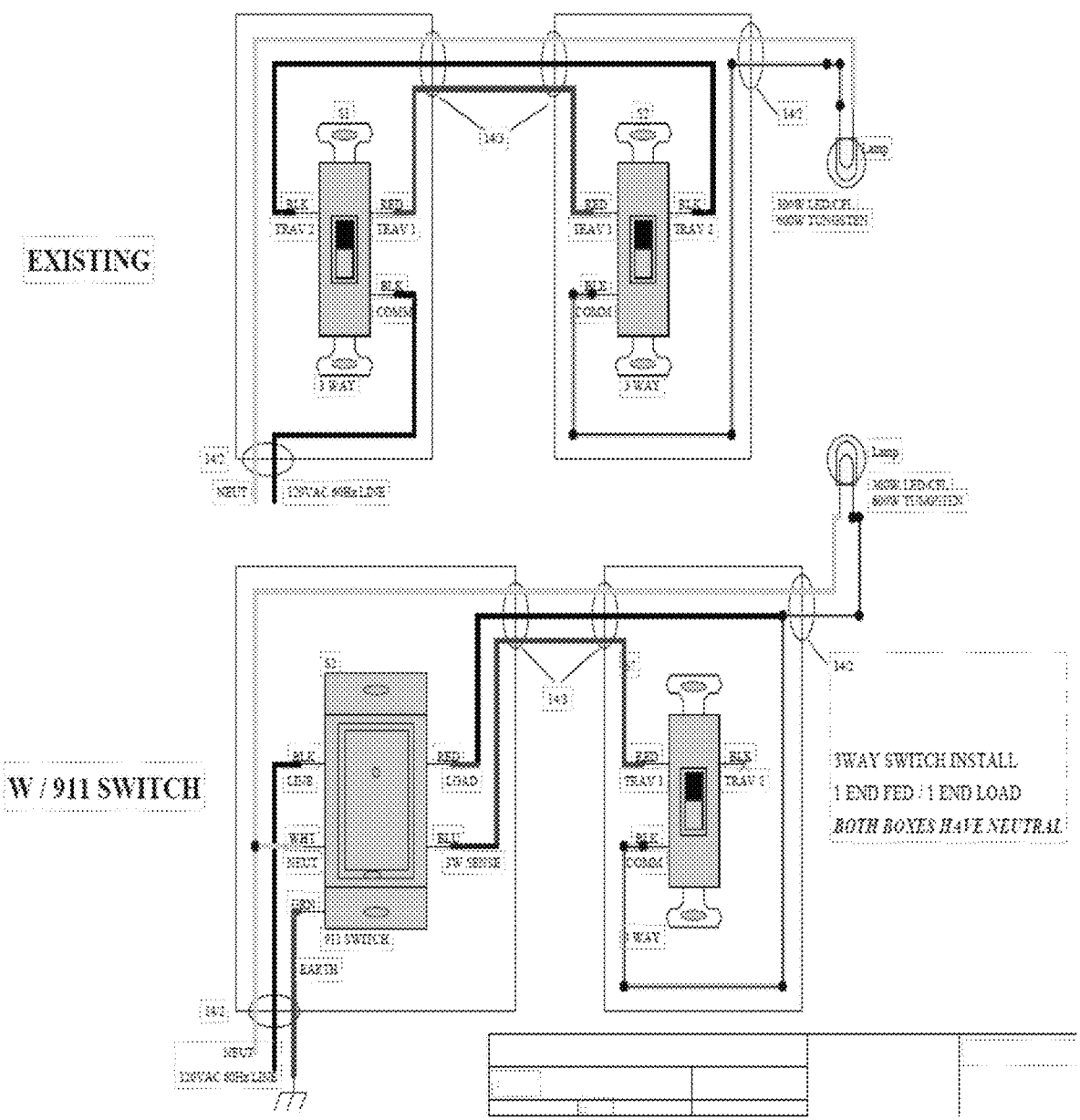
FIG. 18 shows a comparative wiring diagram.

The emergency signal control hub also controls a smart switch (FIG. 18). The smart switch resides within the light fixture. Therefore, the instant system comprises two main subassemblies—a smart switch, and a signal control hub, and in this manner each light fixture is in communication with the smart switch which is thus in data communication with the emergency signal control hub, as follows in the below exemplary embodiment.

a. Smart Switch (with Particular Reference to FIGS. 18-21):

In one embodiment the smart switch may be, e.g., a 12- or 14-amp 120/277 v single pole with either an embedded chip or an external chip that would be encrypted and configured to receive a command from the signal control hub as to what position the respective chip should be, e.g., strobing, flashing or other light sequence, or for the timing cycle for strobing/flashing. Switch may be used for normal on/off operation. When the emergency signal control hub is activated by the smartphone in an emergency situation, the switch normal on/off operation would be overridden in whatever position it may currently be. Once the lighting alert system is deactivated, switch would return to the operating position in which the switch was prior to the emergency activation mode.

b. PCB Assembly Programming

Equipment Required:
1. Microchip PICkit programmer/USB cable
2. PC running Microchip compatible programming software
3. Programming adapter cable
4. Latest firmware (.hex file)
5. Unit to be programmed Programming Procedure:
1. Install software to PC. Go to Microchip website https://www.microchip.com/mplab/mplab-x-ide and at the bottom there is a tab called downloads. This .doc lists the IPE for an older version, later versions being very similar. Download the MPlab X IDE environment. It is a large file, and the entire file need not be installed; however, Microchip does not offer the programming tool as a separate download. Once the download is complete, install the IPE tool only (part of install setup). This is the production programming environment tool. The IDE is unnecessary, so that can be de-selected;
2. Plug the PICkit programmer into an available USB port;
3. Open the IPE software just installed;
4. Select "device" from a large list (drop down menu), you can just type in the part PIC16F1503 and press "apply";
5. Now, the programmer must be made to power the device (to be programmed), Select "settings—advanced mode" from the top menu bar;
6. The default password is "microchip", select the "power" button on the left;
7. Select VDD—there is another drop menu. 3.3V is the desired selection.
8. Then there is a little check box at the bottom "power target circuit from tool", so make sure that is checked and then press the "operate" button on the left;
9. Connect the adapter cable to the 911 switch. The odd color wire is the pin 1 end. Insert the cable into the programming holes, aligning pin 1 with the square hole. Note: It is easier to install this first while not connected to the PICkit, but not a requirement.
10. If the PICkit is not connected to the other end of the adapter cable, insert it also aligning pin 1 with the pin 1 indicator on the PICkit;
11. Now press the "connect" button in the IPE software;
12. The PICkit may have to download internal firmware the first time. It will do this automatically. If you get a warning about 3.3V and 5V device, select OK;
13. You should then get a power enabled at 3.3V and a "target device found" and a revision of the device (this may vary with different silicon revisions from microchip)—pictured by FIG. 18, to show an example of the user interface for this step, which user interfaces are also similar for the above steps;
14. Now we have to point to the hex file we want to load. Press the "browse" button on the right, just under the "Blank Check" button. It's for the "source" space, not SQTP;
15. Navigate to where the latest firmware version is saved in the PC;

16. You should now get a "hex file loaded successfully" in the output window of the software. This only means the file was located and loaded INTO in the software;
17. Now to program the actual 911 switch device, by just pressing the program button;
18. You should get a "program complete" notification along with a "pass count" as pictured below. If not, there could be a connection issue to the PCB. Check the cable;
19. Upon completion, unplug the programming adapter cable from the 911 switch;
20. Connect to the next switch and simply press the program button again; and,
21. The software will increment the "pass counter" after each success.

Note: programming MUST be done before any mechanical assembly begins as the programming header is not accessible once the front panel (faceplate) or case cover 5 is screwed/riveted into place.

c. Signal Control Hub (with Continued Reference to FIGS. 19-21)

Each emergency signal control hub includes a specific serial number. The serial number can be manually entered into the smartphone or via a QR code disposed on the emergency signal control hub. As discussed earlier, the user therefore "adds" their device and is taken through the device set up, including naming device, adding serial number located on back of hub and connecting their Wi-fi to the hub. The user's smartphone is now in communication with the emergency signal control hub, and thus is in communication with the light switch.

The below describes the instant signal control hub PCB assembly 1 hardware and software instructions for the setup and operation of the signal control hub. The signal control hub contains hardware to receive signals from the internet/phone app., external wired interface (alarm panel), decode those signals and send out the activation or deactivation commands to the above-described switches that are linked to this device using PCB assembly 1. The below is an example only.

The hardware box is hub enclosure 2 and in one embodiment plain on all sides except one. Looking at the side of hub enclosure 2 that displays components, four (4) LED's are shown on the left, then two push button switches (button 1 on the left, and button 2 on the right), then a two position connector jack for external triggering connections, and finally on the far right is a USB mini jack.

LED—cluster of four (exemplary embodiment). The top left is RED and directly below it is green. These two indicate modes/status of the unit. The modes will be discussed in more detail in the operation section. The two green LEDs on the right indicate alert mode activation triggers. The top indicates a trigger from the external connector, and the bottom indicates a trigger signal received from WI-FI.

BUTTONS—The two push buttons do various things if pressed, pressed and held, pressed and held in combination while running or at startup. These will be defined in greater detail in the operation section.

2 TERMINAL EXTERNAL CONNECTOR—This connector is an "input" for triggering the alert state. The input can be a voltage signal up to 24 VDC. Actual thresholds may vary. 0V is not in alert mode, and 24V is in alert mode. The jack can be configured to operate in a dry contact (relay) type configuration as well. There are two jumpers that get installed inside. The jumpers installed activate the dry contact trigger detection. In this mode, if the two terminals are shorted together, the unit is in alert mode. If the terminals are open (disconnected) the unit is NOT in alert mode.

USB mini port—This port serves two functions. It is mainly used to power the device with an off the shelf 5V 500 mA minimum power adapter and USB cord. The port is also used for diagnostics and initial Wi-Fi module setup as well as firmware upgrades through connection to a PC USB port.

Operating Modes:

Normal—Lower left LED is on "solid" and blinks a "heartbeat" every 10 seconds to show that it's alive and well. No alarms are active in this mode.

ADDRESS CREATE—used to clear/set a new unique address (just like a FOB) that the switches will all have to learn.

TEST MODE—used to continuously send activation pulses to set up the switches (make them learn) once the internal "address" is configured in this unit (just like setting up a FOB for the first time).

ACTIVE MODE—When an alert signal is received, the unit drives the remote signal to activate the switches and illuminates the status LED's depending on what signal did the activation.

WI-FI FIRMWARE DOWNLOAD MODE—The left red and green LED's flash fast alternately. This indicates that the module has been placed in a mode to receive a firmware file uploaded over the USB cable from a PC.

RESET—After a firmware upgrade, the Wi-Fi module can be reset without having to remove and reinstall power. Can be useful when reading boot information from a serial terminal window in the PC.

Operation:

Create Address

The first procedure that has to be performed is setting the unique address that the switches must learn and will respond to. At initial power up, press and hold button 2 before applying power. When the power is applied, the RED LED will be on solid for a couple seconds only. Release the button while the RED LED is still on, and the GREEN status LED starts blinking at a fast rate. Now the next step is a press and hold action. The address will be randomly generated only while you press and HOLD button 1. The RED LED should be on solid while you are holding button 1. When you release button 1, the RED LED blinks. This means it is now activating the on/off command interface. While the RED LED is still blinking, press button 1 again and this will save the new address. Once completed properly, the unit returns to "normal" mode, and the GREEN status LED is on solid with a heartbeat blink every 10 seconds.

If you initially hold button 2 too long, the unit automatically skips the create address mode and goes straight to "normal" mode.

* NOTE: if you do successfully enter this create address mode by mistake, you can safely exit—without deleting any old address (while the GREEN LED is blinking fast only—by pressing button 2** again or power cycling). Once you have made it to the RED LED solid or blinking state, the original address (if any was stored) will be deleted. This cannot be undone, and any switch that was linked to this old address will have to re-learn the newly generated address.

Test Mode

Once an address has been properly generated, we can now place the unit in a "test" mode to continuously send remote activation commands so that the switches can learn this new address.

From normal mode, press and hold button 1 for a few (~5) seconds. The GREEN status LED will go off, and the RED will illuminate. Release button 1 and the RED LED will blink every time a remote activation command is sent.

To stop the test mode and send out a deactivation sequence, press and hold button 1 again for a few seconds and release. The GREEN status LED will blink while the deactivation command is sent, and then will return back to "normal" heartbeat mode.

Wi-Fi Download Mode

If it becomes necessary to upgrade the firmware in the Wi-Fi module, the unit has to be placed in download mode.

To do this, remove power. Press and hold both buttons while applying power. Both LED's will be illuminated solid. When you release the buttons, both LED's will flash alternately. The unit is now in UART download mode. No firmware changes will take place until the upload "tool" (windows executable) communicates with the device along with a proper binary file to upload.

To exit this mode, press and release either button. The unit will return to normal mode.

NOTE: If it becomes necessary to view unit output information via a terminal window after download of new firmware, it is sometimes advantageous to just "reset" the Wi-Fi module while the USB cable is still attached as most messages from this module are output at power up. If you tried to plug the USB cable in to catch this information, most likely it will be missed. The easiest way to overcome this is a "RESET" command. The reset only affects the Wi-Fi module and not the unit as a whole. To perform a Wi-Fi reset from normal mode, press and hold both buttons. The green LED is already on, and when the red illuminates, release the buttons. Both LED's will de-activate and the unit will be back in normal mode with the green heartbeat LED.

Connection to a Pc Serial Terminal

The chip inside that converts USB to serial communications is an MCP2200. A driver needs installed to set the USB connection as a virtual COM port. The driver can be downloaded here for example:

http://www.microchip.com/developmenttools/Product-Details/PartNo/MCP22_00EV-VCP

Wi-Fi Setup

With a terminal program, (Windows Hyper Terminal or RealTerm https://sourceforge.net/projects/realterm/ works well) open the USB port virtual driver that gets assigned when you plug the hub into a PC USB port. Set the baud rate to 115200, 8 data bits, no parity, no flow control. Reset the Wi-fi module with the button sequence described above.

The initial information at the beginning is the Wi-Fi module booting with a different baud rate. The IP address shown is what you will need to enter into your browser address bar to set the Wi-Fi module to your local wireless network.

First, connect your PC or Phone to the AutoConnectAP network (the one generated by the Wi-Fi module in the hub). Type the IP address into your browser. Now select your local network SSID that you want to use, and enter your password to connect. Then press the "save" button. Now reset the unit RAD with the buttons and watch the output to the terminal window. You should see an IP address for the hub on your local network.

Set your PC/Phone back to your local network if it did NOT already reconnect on its own.

Open a browser window and enter the new IP address of the RAD.

Pressing the GPIO4 "ALERT" button will activate the alert mode.

ANY CLICK ON THE "RESET WI-FI PARAMETERS" button will immediately reset the saved SSID/PASSWORD and any assigned IP address. After clicking this button, you will have to revert back to the AutoConnectAP network and set your will credentials again.

The now logged-in user can add emergency contacts in an emergency alert contact module 90. The application takes the user through the requisite steps to add new emergency contacts. Here, invitations are sent to the selected contact such that the recipient can "accept" or "deny" the request. If accepted, a confirmation invitation is sent back to the contact. An emergency contact list can display confirmed, pending and rejected contacts.

This emergency alert contact module 90 which makes up a component of the mobile application software communicates with the emergency contact list once activated. In this manner, one or more contacts are made aware of the emergency occurring at the same location the lighting alert system is activated.

The emergency alert contact module 90 also communicates with the "911 activation" of the user. As above, when the user activates the emergency signal control hub, concurrently, the emergency alert contact module 90 is activated wherein the user can call 911 to either speak with the 911 call center or enter into a silent chat mode (emergency chat module, FIG. 15) with the 911 call center.

To effectuate the signal and data transfer, data is transferred from the smartphone mobile application software, i.e., computer-readable medium, to a server stack. The server can reside locally or, preferably, be cloud-based much like dedicated, third-party services (AWS). The server stack is communicated to by the user's Wi-fi hub connection, which, in turn, communicates with a server based upon the unique hub serial number. The designated switch is thereby activated or deactivated based upon the communication between the user and the server. For instance, the flow chart of FIG. 2 represents the data transfer from smartphone app to AWS server stack, hub connection to user's Wi-fi, hub communicating with server based upon unique hub serial number and 911Switch activate or deactivate communication between user and server.

As such, upon activation of the emergency alert system, communication signals are sent in triplicate—to the switch; direct to 911; optionally, to a third-party emergency contact, "optionally" here meaning in the instance the user chooses to implement the emergency alert contact module 90 and set up and use the emergency contact list.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A computer-implemented method for alerting emergency personnel, comprising the steps of:
using a mobile device configured to identify a user location of a user and an emergency contact list, wherein said emergency contact list is stored and managed via said mobile device, transmitting an emergency alert signal to a control hub, said control hub in wireless communication with a server;

in response, allowing said emergency alert signal from said mobile device to then transmit from said control hub to a designated switch of a light fixture, wherein said light fixture is activated into a flashing mode such that a visible, flashing display of light is presentable to said emergency personnel;

concurrently, allowing said emergency alert signal from said mobile device to then transmit from said control hub to a 911 call center; and, allowing said emergency alert signal to concurrently transmit over said server to a third-party emergency contact accessed from said emergency contact list.

2. The method of claim 1, further comprising the step of programming said smart switch.

3. The method of claim 2, wherein for the step of programming said smart switch, a production programming environment tool is downloaded onto a computer, and said smart switch, in communication with said computer, is loaded with said production programming environment tool.

4. The method of claim 1, further comprising the step of setting up said control hub, and wherein the step of setting up said control hub further comprises linking said control hub to said mobile device.

5. The method of claim 4, further comprising the step of adding a device to a user account on said mobile device as part of a device addition module such that said control hub can be linked to said mobile device.

6. The method of claim 5, further comprising the step of adding a serial number located on said control hub into said user account.

7. The method of claim 6, further comprising the step of connecting said control hub to a user's local Wi-fi.

8. The method of claim 1, wherein for the step of allowing said signal to concurrently transmit over said server to a third-party emergency contact, an emergency alert contact module is activated, wherein said emergency contact list includes said third-party emergency contact maintained by said mobile device such that said third-party emergency contact receives said signal and is thereby alerted.

9. The method of claim 8, wherein said third-party emergency contact receives a message generated by said emergency alert contact module and can accept or reject population into said emergency contact list.

10. The method of claim 8, further comprising the step of allowing said user to chat with said 911 call center in response to activation of a chat module such that said user can communicate with said 911 call center silently, said chat module activated upon activation of said emergency alert contact module.

11. A non-transitory computer-readable medium with stored contents that cause one or more mobile devices to perform the steps of:

using said mobile device, said mobile device configured to identify a user location and an emergency contact list, wherein said emergency contact list is stored and managed via said mobile device, transmitting an emergency alert signal to a control hub, said control hub in wireless communication with a server;

in response, allowing said emergency alert signal from said mobile device to then transmit from said control hub to a designated switch of a light fixture, wherein said light fixture is activated into a flashing mode such that a visible, flashing display of light is presentable to emergency personnel; and, allowing said emergency alert signal to concurrently transmit over said server to a third-party emergency contact accessed from said emergency contact list.

12. The medium of claim 11, further comprising the step of programming said smart switch.

13. The medium of claim 12, wherein for the step of programming said smart switch, a production programming environment tool is downloaded onto a computer, and said smart switch, in communication with said computer, is loaded with said production programming environment tool.

14. The medium of claim 11, further comprising the step of setting up said control hub, and wherein the step of setting up said control hub further comprises linking said control hub to said mobile device.

15. The medium of claim 14, further comprising the step of adding a device to a user account on said mobile device as part of a device addition module such that said control hub can be linked to said mobile device.

16. The medium of claim 15, further comprising the step of adding a serial number located on said control hub into said user account.

17. The medium of claim 16, further comprising the step of connecting said control hub to a user's local Wi-fi.

18. The medium of claim 11, wherein for the step of allowing said signal to concurrently transmit over said server to a third-party emergency contact, an emergency alert contact module is activated, wherein said emergency contact list includes said third-party emergency contact maintained by said mobile device such that said third-party emergency contact receives said signal and is thereby alerted.

19. The medium of claim 18, wherein said third-party emergency contact can accept or reject population into said emergency contact list.

\* \* \* \* \*